M. W. JOHNSON, Jr.
GAS WASHER.
APPLICATION FILED JUNE 5, 1911.
1,034,463.
Patented Aug. 6, 1912.
3 SHEETS—SHEET 1.
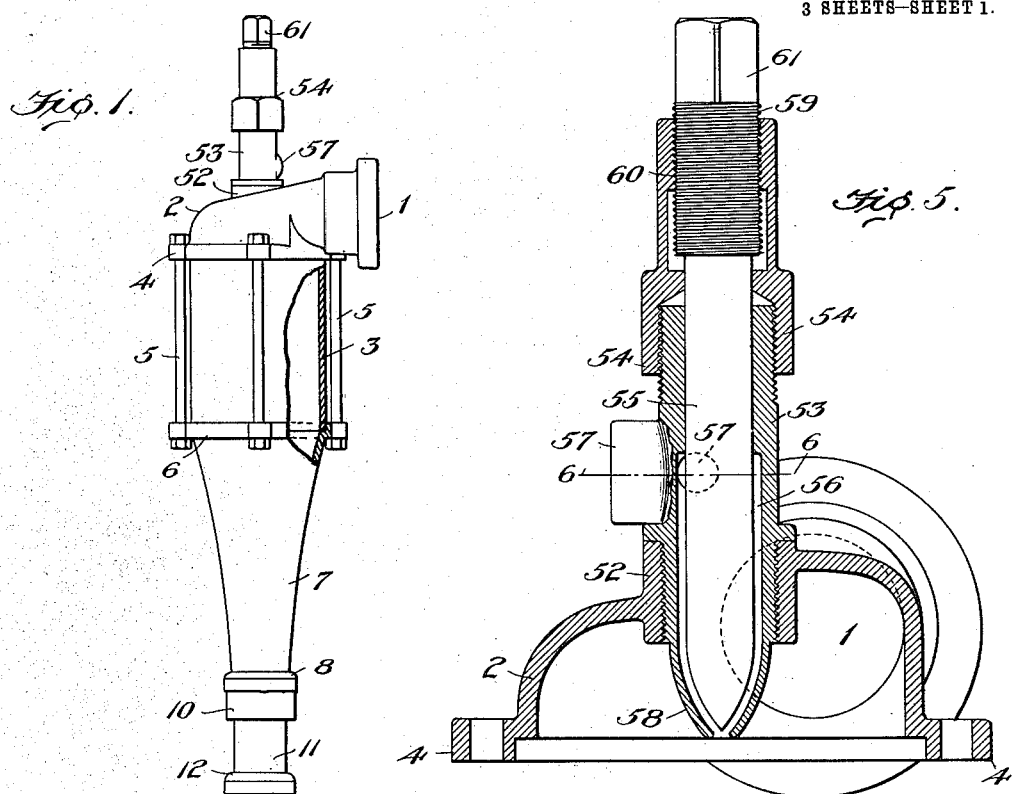
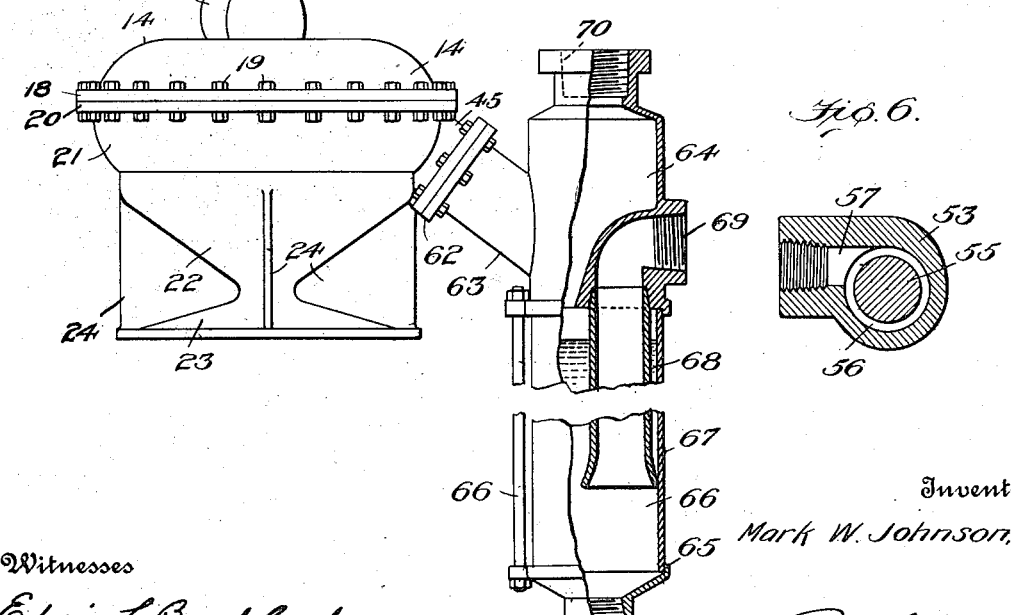
Witnesses
Edwin L. Bradford
Nomir Helal
Inventor
Mark W. Johnson, Jr.
By
Attorney

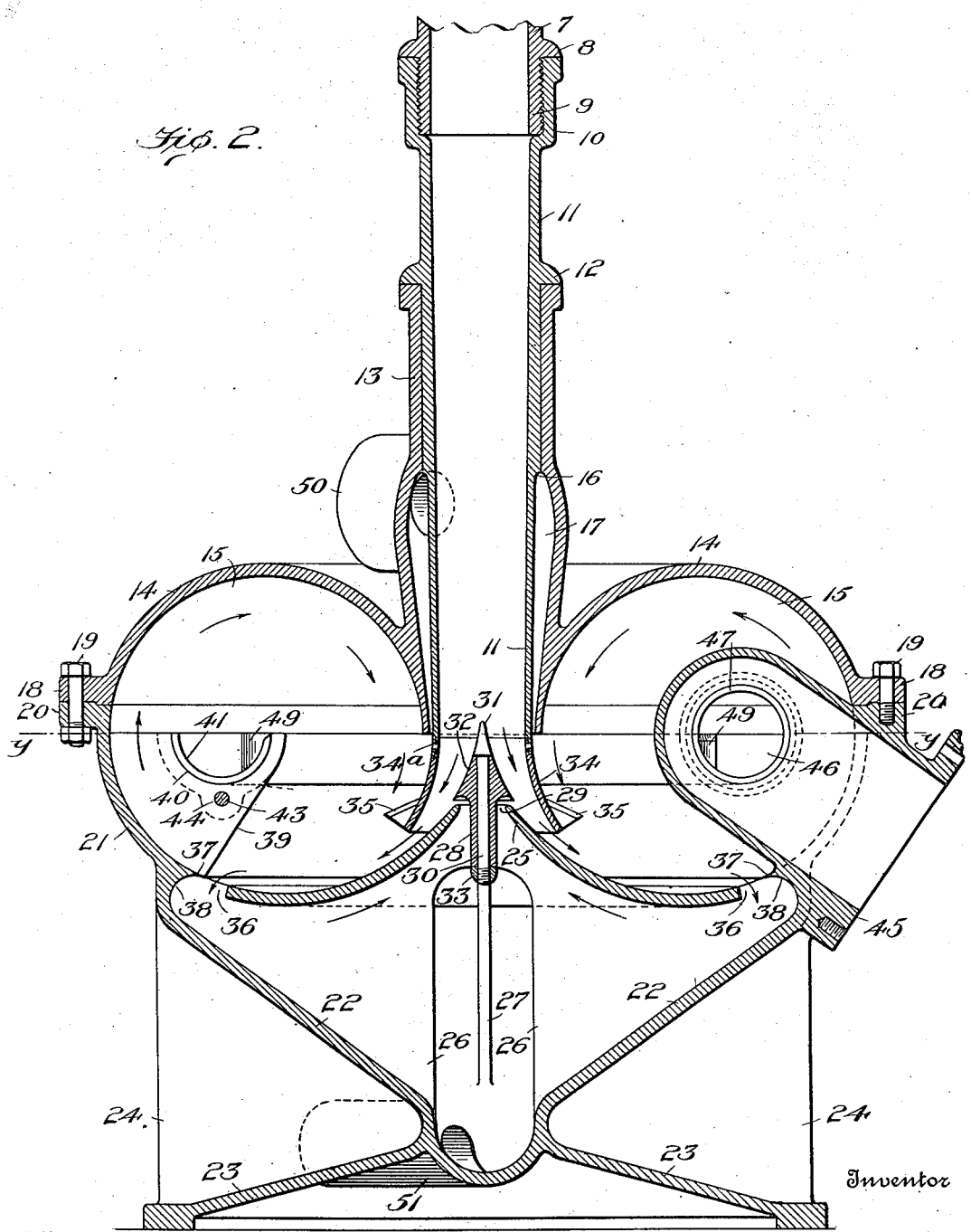

M. W. JOHNSON, Jr.
GAS WASHER.
APPLICATION FILED JUNE 5, 1911.
1,034,463.
Patented Aug. 6, 1912.
3 SHEETS—SHEET 3.
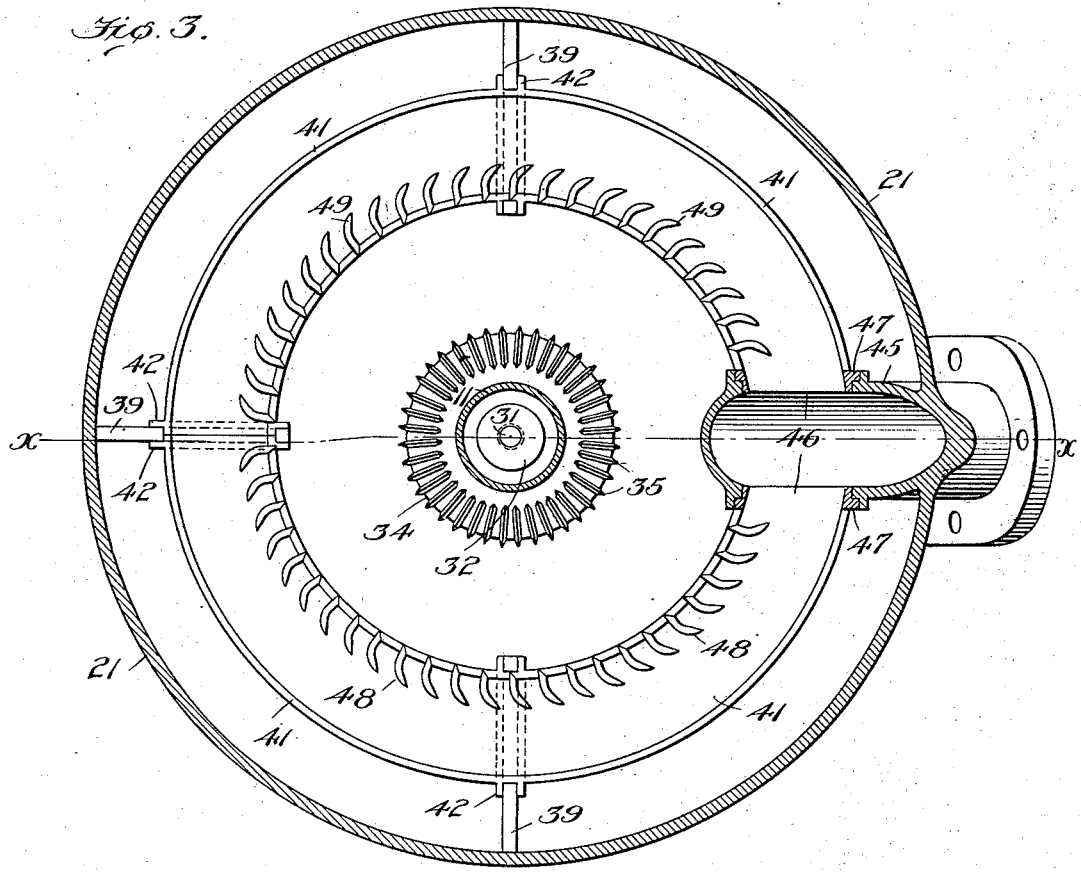
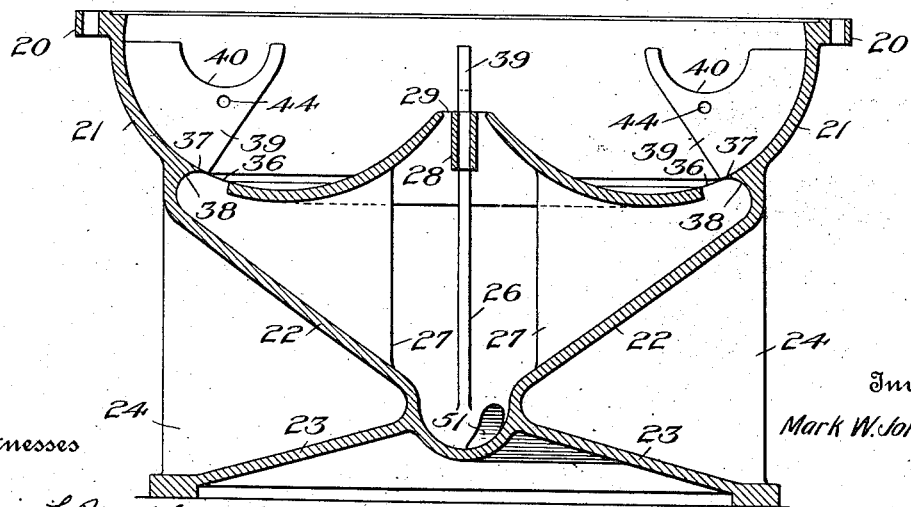
Witnesses
Edwin L. Bradford
Inventor
Mark W. Johnson Jr.
By
Attorney

UNITED STATES PATENT OFFICE.

MARK W. JOHNSON, JR., OF BIRMINGHAM, ALABAMA.

GAS-WASHER.

1,034,463.  Specification of Letters Patent.  Patented Aug. 6, 1912.

Application filed June 5, 1911. Serial No. 631,303.

*To all whom it may concern:*

Be it known that I, MARK W. JOHNSON, Jr., a citizen of the United States, residing at Birmingham, in the county of Jefferson and State of Alabama, have invented certain new and useful Improvements in Gas-Washers, of which the following is a specification.

My invention relates to an apparatus for cleaning gas and like fluids and operates upon the vortex principle in that the body of gas to be cleaned is given a vortex or spiral movement about an axis in a closed vessel so that the dust and other impurities tend to become concentrated in the outer stratum of the whirling body. In my present invention I propose to quickly and effectively collect and discharge from said vessel the dust and impurities in the gas by causing the gas, together with a stream of water, to whirl with a vortex motion in a cleaning chamber which is provided with means to divert therefrom the dust which is centrifugally collected in the outer stratum of the whirling body of water or other cleaning liquid.

A further feature of my invention is to thoroughly dampen the dust by directing a spray of water into the inflowing body of gas before it enters the cleaning chamber.

My present invention is a modification of the principles of construction and operation claimed in my pending application, Serial No. 509,511, filed July 26th, 1909, in which the vortex principle is disclosed in a dry cleaner wherein centrifugal force, which may be assisted by an electric discharge to polarize the dust, is used to concentrate the impurities in the gas in the outer stratum of a whirling mass thereof, which stratum is diverted from the cleaning chamber into a hopper while the cleaned gas is drawn off from the center of the vortex or whirling mass of gas in the cleaner.

In many instances it is desirable to sacrifice the heat of the gases in a wet cleaner to obtain a more perfect elimination of the impurities, and my present invention has been designed with this end in view and may be used either separately or in series with my dry cleaning apparatus above referred to.

One object of my present invention is to introduce the cleaning fluid into the vortex chamber so that the gas is caused to flow through a whirling mass of water in the cleaning chamber the gas thus being separated into bubbles which, as they are swept around in the casing with the water are thoroughly scoured and cleaned of all impurities before they work to the center of motion of the vortex and diverted from the cleaning chamber. The impurities centrifugally concentrated in the outer stratum of the whirling mass of water, pass off with such stratum into a hopper, where they are deposited, a means to produce a circulation of water through the hopper and back into the cleaning chamber being provided to insure the said outer stratum being diverted thereinto from the cleaning chamber.

I have illustrated my invention in connection with the general type of cleaner disclosed and broadly claimed in my said pending application. My present invention however comprises certain details of construction and novel arrangements of parts which are more particularly claimed hereinafter and which are illustrated in the accompanying drawings, in which:—

Figure 1 is a side elevation of my improved apparatus. Fig. 2 is a vertical transverse sectional view along the line x—x of Fig. 3. Fig. 3 is a horizontal view along the line y—y of Fig. 2. Fig. 4 is a vertical sectional view of the base with the gas spreader and the collecting trough removed. Fig. 5 is an enlarged vertical sectional view through the top of the gas and water inlet head. Fig. 6 is a transverse sectional view along the line 6—6 of Fig. 5.

Similar reference numerals refer to similar parts throughout the drawings.

I have illustrated my invention in connection with a cleaner of the vortex ring type. The gas or like fluid to be cleaned enters the cleaner through a port 1 which discharges the gas tangentially into the chamber formed in the head 2, the port 1 being disposed at a tangent to said head. The head is mounted upon a drum 3 and has flanges 4 which are connected by screw bolts 5 to a similar flange 6 at the head of a converging pipe 7. This pipe is provided at its contracted bottom with a flange 8 and a threaded portion 9, which latter portion is adapted to be threaded into the shouldered end 10 of a pipe 11, which is provided with an external shoulder 12 which engages and rests upon an outer sleeve or cylinder 13 that is formed integral with the top section of the cleaner chamber 15. The pipe 11, below the shoulder 12, is gradually tapering to the point 16 where it is peripherally reduced opposite a flaring portion of the sleeve 13 to form the annular chamber 17 which entirely surrounds the bottom end of the pipe 11 and is of gradually decreasing diameter until at the bottom of the pipe 11 it forms a narrow annular orifice.

The top section 14 of the annular vortex ring chamber 15 is provided with a peripheral flange 18 which rests upon and is connected by screw bolts 19 to a similar flange 20 formed on the bottom portion 21 of the chamber, which bottom portion is preferably formed integral with the converging hopper 22 and the base 23. Vertical webs 24, also preferably formed integral with the base and hopper, serve rigidly to support and brace the apparatus. The bottom wall of the section 21 (Fig. 2) as it approaches the center of the machine, curves inwardly and upwardly until it terminates in a truncated cone 25 which is open at the top. The bottom wall of 21 is braced and supported from the hopper 22 by vertical webs 26 and 27, the webs 26 being oppositely disposed and the webs 27 being disposed oppositely to each other and at right angles to the webs 26 and being connected at their tops by a cross member 28 which extends centrally across the opening 29 in the cone 25 and has a vertical opening therethrough concentric with 29 to receive a pin 30 which has its head 31 pointed and adapted to engage a tapering spreader 32, the outer walls of which form a continuation of the flaring walls of the head 31 and which at its bottom is cut away to leave a return circulation passage between the same and the circular top edge of the truncated cone 25 for the gas and water diverted into the hopper. This spreader 32 rests upon the cross member 28 and is held in place by a nut 33 which engages the lower threaded end of the bolt 30 and is adapted to be screwed up against the member 28. For convenience in assembling, I provide the pipe 11 with a bottom flaring discharge nozzle piece 34 which is adapted to be connected thereto by bolts or rivets which pass through a smooth lap joint 34ª or in any suitable manner. The joint is preferably a smooth flush joint both inside and outside. This piece 34 forms the outer portion of an outwardly flaring nozzle, the inner portion of which is formed by 31, 32 and the truncated cone 25. Around the lower peripheral edge of 34 I provide a series of radial fins 35 which are sharpened along their upper edges.

In the bottom of the chamber 15 I provide an annular port 36, the outer edge of which is formed as a knife edge 37 and therefore constitutes a deflector, and the underside of which is formed by a curved annular surface 38 which merges into the inclined bottom wall 22 of the hopper. The webs 26 may extend across the opening 36 if desired or may terminate at the inner edges of the opening 36. The section 21 is provided with segmental shaped vertical webs or flanges 39 which are disposed 90° apart about the chamber and extend inwardly and vertically about the center of the chamber. These webs are clearly shown in Fig. 4 and are provided with curved recesses 40 in their upper edges which are adapted to receive the gas collecting trough 41. This trough is formed preferably of thin metal, semi-circular in cross section, and provided with pairs of lugs 42, each pair of which straddles a web 39 and is connected thereto by a bolt 43 which passes through an opening 44 in the web. The trough is open at the top and extends from one side of the discharge pipe 45 around the chamber to the other side of said pipe. This discharge pipe enters the chamber in a radial direction and is closed except at each side where it has opposite ports 46. These ports are annular and receive therein an annular fitting 47 formed integral with the ends of the trough 41. The inner top edge of the trough is sharpened to give a cutting edge which diverts the inner stratum of water and gas from the whirling mass in the chamber, the axis of rotation of the vortex being an annular line along and coincident with a line defined by the axes of the curved cross sections of the trough in vertical radial planes. The trough is provided along its inner edge with a series of vertical deflectors 48 and 49. The deflectors on one side of a vertical plane through the discharge pipe being curved in plan view so as to direct the gases by the nearest route along said trough to said discharge pipe, the deflectors 49 being curved in the reverse direction to deflectors 48.

Water is introduced into the chamber 17 through the pipe 50 and flows down to the jet orifice at the bottom of said chamber. The water and the cinders and dust collected therewith may be discharged from the bottom of the hopper 22 through a pipe 51.

A spray of water is discharged downwardly through the center of the head 2, said head having a collar 52 which is internally threaded to receive the threaded end of a pipe 53 which is threaded at its upper end to receive a gland 54. A needle valve 55 is vertically adjustable in said pipe making a close water tight fit in the upper portion thereof and being centrally disposed with reference to a chamber 56 formed by enlarging the internal diameter of the lower portion of the pipe at and below the point of entrance of the water supply pipe 57. The lower end of the pipe is formed into a converging nozzle 58. The pipe 57 enters the pipe 56 tangentially, as seen in Fig. 6. The top of the needle valve is threaded at 59 and is in threaded engagement with the top 60 of the screw gland 54. By screwing the needle valve in and out through the portion 60 it will control the discharge of water through the nozzle 58.

The discharge pipe 45 is shown connected by a suitable coupling 62 to a pipe 63 which leads into the top portion 64 of a separator, which top portion is connected to the bottom portion 65 by a long bolt 66, there being interposed between the top and bottom a cylindrical chamber 67 in which the body of water is maintained. An outlet pipe 68 leads from below the water level to an outlet port 69 in the top 64. The bottom 65 has a suitable drain opening for blowing off mud which is normally closed and a port 70 in the top 64 through which the cleaned gas flows into the pipe line for use.

In operation, the gas is admitted through port 1 and the needle valve 55 is adjusted to discharge a whirling spray of water into the center of the gas as it whirls in the chamber 3. The mixed gas and water vapor pass downwardly through pipe 11, which being contracted tends to increase the velocity of the gases, which then strike the apex 31 and are spread out into an annular sheet which flows out between 25 and 34 into the cleaning chamber. A stream of water has been admitted through pipe 50 into chamber 17 and is discharged through the ring nozzle at the bottom thereof so that it flows along down the outer wall of nozzle piece 34. The fins 35 open up this sheet of water so that the gases entering under it find a ready passage into the whirling mass of water. The gas and water, both entering the chamber tangentially will whirl therein as a vortex wherein the bubbles of gas tend to move spirally in vertical radial planes through the water and converge toward the axis or center of the whirling mass which is over the trough 41, the area between the outer edge of the trough and outer wall of the chamber being equal to the area between the inner edge of the trough and the inner wall of the chamber. The vortex whirl of the water and gas tends by centrifugal force to collect the heavier impurities in the gas in the outer stratum of water which flows along the wall of the casing 2 so that the knife edge 37 will skim the same from the whirling mass and deflect it into hopper 22. The gas which may have been diverted with the water into the hopper, together with the cleaner water therein which is displaced by the inflowing stratum of dirty water, will both flow up the walls of cone 25 and pass back into the circulation through port 29, the inflowing gas acting with a slight injector effect to draw them back into the cleaning chamber. The inner sharp edge of trough 41 skims off the inner or cleanest stratum of the gas and water and the deflectors 48 and 49 cause same to flow along the trough and through ports 46 into the discharge pipe 45 and thence into the casing 64, where the gas and water are separated, the water passing down and out through pipe 68 and port 69, while the gas passes up through port 70 to the points of consumption. All sediment deposited in the hopper may be blown out through pipe 51.

I prefer to have the gas and water whirl many times in the chamber before being caught in trough 41, thereby giving more time for centrifugal action to cause the cinders and dust, caught in the whirling mass of water, to be forced to the outer stratum thereof which sweeps over and through the skimming port 36, so that all the impurities are sure to be caught.

When I refer to a circular or vortex-ring-chamber I mean a chamber in the form of an annulus, the cross sections of which, as cut by radial planes perpendicular to the plane of the annulus, are circles or substantially round. But when I refer to a circular chamber I refer to one having cross sections as above but which need not be an annulus and in which the gas whirls about an axis which may be a straight or curved line as contrasted with a circle in a vortex-ring-chamber.

I prefer the vortex ring chamber, but the principles of operation upon which my invention is based, make it possible to use widely varying shapes of cleaning chambers without departing from the spirit of my invention.

Having thus described my invention, what I claim as new and desire to secure by Letters Patent, is:—

1. In an apparatus of the character described, a cleaning chamber, means to produce therein a whirling mass of water which substantially fills said chamber, means to introduce the gas to be cleaned into the outer stratum of said water, means to divert from said chamber the outer portion of the whirling mass of water in which the impurities are concentrated, and means to draw off the cleaned gas which bubbles to the center of the whirling mass of water, substantially as described.

2. In an apparatus of the character described, a cleaning chamber, means to deliver thereinto a stream of gas in a direction which will cause same to whirl in a vortex therein, means to pass said stream of gas into a whirling mass of water which substantially fills said chamber, means to skim off the outer stratum of the whirling water, and means to draw off the cleaned gas which bubbles to the center of the whirling mass of water, substantially as described.

3. In an apparatus for cleaning gas by a combined washing and centrifugal means, a cleaning chamber having deflecting surfaces causing the gas discharged thereinto to flow with a vortex movement about an axis, means to bring said gas into contact with a flowing body of water which substantially fills said chamber, deflecting means in said surfaces to divert water and the impurities caught therein from the whirling body of gas and water, and means to draw off the cleaned gas from or near the center of the vortex, substantially as described.

4. In a gas cleaning apparatus, a chamber having a substantially circular cross section in a given plane, an inlet gas conduit arranged to deliver the gas into said chamber tangentially and in the plane of its circular cross section, means to deliver a stream of water into said chamber in the same direction as said stream of gas so that the water tends to whirl in a vortex in said chamber and substantially fills said chamber, a hopper, a deflecting means in said chamber which is adapted to deflect the outer stratum of the whirling mass of gas and water, in which the dust is centrifugally concentrated, into said hopper and means to draw off the gas which bubbles to the center of the whirling mass of water.

5. In a gas cleaning apparatus, a cleaning chamber circular in cross section, a gas inlet pipe disposed in the plane of said cross section and having a nozzle for delivering the gas in a thin sheet tangentially into said chamber, a water supply passage, a nozzle therefrom adapted to deliver a shallow stream of water tangentially into said chamber and above said inflowing gas, a hopper, deflecting means to divert the water and the dust collected therein into said hopper, the inflow of water being greater in quantity than that diverted by said deflecting means to cause the water to substantially fill the chamber, and means to draw off the cleaned gas and surplus water from the center of the whirling mass in said chamber.

6. A gas cleaner having a ring-shaped vortex chamber, an annular nozzle to discharge gas tangentially into said ring shaped chamber, a hopper below said chamber, a nozzle to discharge a stream of water tangentially into said ring chamber to substantially fill same with a whirling mass of water, and means to deflect the outer stratum of the water in which the dust is collected from the gas into said hopper, substantially as described.

7. In a gas cleaner, a cleaning chamber, means to introduce gas therein so that it whirls in a vortex, means to draw off the cleaned gas from the center of the vortex, means to pass the gas through a whirling mass of water which substantially fills said chamber, means to divert the dirty water from the outer portion of the whirling mass of water and gas, and means to divert water and gas from the center of the vortex, substantially as described.

8. In a gas cleaning apparatus, a vortex ring chamber having two annular inlet nozzles both tangentially disposed, means to discharge water through the upper and gas through the lower nozzle, means to skim off the outer stratum of the whirling mass of gas and water, and means to draw off the cleaned gas and surplus water, substantially as described.

9. A wet cleaner for gas utilizing the vortex principle comprising a vortex ring chamber having an annular narrow gas inlet port, a narrow water inlet port, an annular discharge port, an annular knife edge deflector disposed on the far side of said discharge port, a hopper into which said port opens, means to provide a circulation of water and gas through said port and hopper and back into the main chamber, and means to draw off the cleaned gas, substantially as described.

10. In a gas cleaner, a vortex ring chamber, means to discharge tangentially thereinto a sheet of gas, means to discharge thereinto a sheet of water so that both gas and water tend to whirl in a vortex in the chamber, a receptacle, means to divert the outer stratum of the whirling gas and water into said receptacle which has a port through which the gas and water return to the circulation in said chamber, means to draw off the cleaned gas, and means to introduce a spray of water into the gas before it enters said cleaning chamber, substantially as described.

11. A gas cleaner comprising a chamber and means to discharge gas and water therein so as to produce a whirl, means to open up the whirling body of water in a number of places at the time the inflowing gas will contact therewith, means to divert the outer stratum of water and impurities therein from the chamber, and means to draw off the clean gas at the center of the whirling mass of water and gas, substantially as described.

12. A wet gas cleaner comprising a horizontally disposed ring-shaped cleaning chamber, a vertically disposed gas inlet pipe having an annular discharge end which enters at a tangent the inner side of said ring chamber, a water pipe surrounding the gas pipe and also having an annular outlet end which enters the inner wall of the ring chamber above the gas inlet port and at a tangent, said ring chamber having a curvilinear cross section in vertical planes to cause the entering gas and water to whirl therein with a vortex motion, means to draw off the impurities from the outer stratum of the whirling gas and water, and means to draw the purified gas from the center of the vortex, substantially as described.

13. A wet gas cleaner comprising a ring-shaped chamber, a gas inlet pipe having an annular discharge nozzle which delivers an annular jet of gas tangentially into the inner side of said ring chamber, a water pipe surrounding the gas pipe and also having an annular discharge nozzle which delivers an annular jet of water tangentially into the inner wall of the ring chamber above the entering gas, means to discharge the water supply tangentially into said water pipe to distribute it uniformly therein, said ring chamber having curvilinear walls which receive the entering gas and water and cause same to whirl therein with a vortex motion, means to draw off the impurities from the outer stratum of the whirling mass of gas and water, and means to draw off the purified gas from the center of the vortex, substantially as described.

14. In a gas cleaner, a ring-shaped cleaning chamber, means to discharge water and gas tangentially into the inner side of said ring chamber, the walls of said chamber being curvilinear to receive the entering water and gas and guide same into a vortex whirl, a curved trough disposed in said chamber along the center line of the vortex whirl, a discharge pipe to receive water collected in said trough and cleaned gas, and means to divert the outer stratum of water from said chamber.

In testimony whereof I affix my signature in presence of two witnesses.

MARK W. JOHNSON, Jr.

Witnesses:
NOMIE WELSH,
R. D. THURSTON, Sr.